Patented Jan. 13, 1948

2,434,394

UNITED STATES PATENT OFFICE 2,434,394

PRODUCTION OF UNSATURATED ALCOHOLS

Harry A. Cheney, Robert Dagley, Jr., and Sumner H. McAllister, Berkeley, Calif., assignors to Shell Development Company, San Francisco, Calif., a corporation of Delaware No Drawing. Application November 13, 1945, Serial No. 628,358

17 Claims. (Cl. 260—632)

The invention relates to the production of unsaturated alcohols. More particularly, the invention pertains to the vapor phase hydrolysis of an unsaturated ether to the corresponding unsaturated alcohol. A preferred embodiment of the invention comprises the vapor phase hydrolysis of an unsaturated ether containing an unsaturated linkage between two carbon atoms of aliphatic character one of which is directly attached to a saturated carbon atom which is linked directly to the ether-oxygen atom, in the presence of a solid hydration catalyst, to produce the corresponding unsaturated alcohol containing an unsaturated linkage between two carbon atoms of aliphatic character one of which is linked directly to the carbinol carbon atom. A specific embodiment of the invention comprises the vapor phase hydrolysis of diallyl ether in the presence of a copper sulfate catalyst to produce allyl alcohol.

The unsaturated ethers which are to be hydrolyzed according to the process of the invention may be symmetrical or mixed ethers, and the mixed ethers may contain two different unsaturated radicals or one unsaturated radical and one saturated or aromatic radical attached to the ether-oxygen atom. A preferred group of unsaturated ethers which may be reacted comprises those wherein there is attached to the ether oxygen atom a radical which contains an unsaturation between two carbon atoms of aliphatic character both of which are separated from the ether-oxygen atom by at least one carbon atom. Suitable examples of the unsaturated ethers are allyl methyl ether, methallyl ethyl ether, crotyl methyl ether, allyl vinyl ether, methallyl isopropyl ether, tiglyl phenyl ether, cinnamyl butyl ether, allyl cyclohexyl ether, 3-butenyl methyl ether, 3-pentenyl propyl ether, 3-hexenyl amyl ether, 4-hexenyl ethyl ether, 3-cyclohexenyl vinyl ether, 5-hexenyl isopropenyl ether, chloroallyl ethyl ether, propargyl methyl ether, and the like and their homologues and analogues.

The process of the invention is particularly valuable when applied to ethers wherein each of the radicals attached to the ether oxygen atom contains an unsaturation between two carbon atoms of aliphatic character both of which carbon atoms are removed from the ether oxygen atom by at least one carbon atom, and more preferably to the symmetrical unsaturated ethers wherein each of the unsaturated radicals contains an olefinic linkage between two carbon atoms of aliphatic character one of which is directly attached to a saturated carbon atom which is directly linked to the ether-oxygen atom. Examples of this particularly valuable group of unsaturated ethers to which the invention may be applied are di(3-butenyl) ether, di(3-pentenyl) ether, di(4-hexenyl) ether, di(4-cyclohexenyl) ether, allyl 3-butenyl ether, methallyl 3-pentenyl ether, crotyl 4-cyclohexenyl ether, allyl methallyl ether, allyl cinnamyl ether, methallyl tiglyl ether, allyl crotyl ether, chloroallyl methallyl ether, allyl propargyl ether, and the like and their homologues and analogues. The preferred beta, gamma-unsaturated symmetrical ethers include diallyl ether, di(methallyl) ether, dicrotyl ether, ditiglyl ether, dicinnamyl ether, di(2-cyclopentenyl) ether, di(chloroallyl) ether, di(ethallyl) ether, di(3-chloro-2-butenyl) ether, di(2-methyl-2-hexenyl) ether, di(2-methyl-2-pentenyl) ether, di(2-cyclohexenyl) ether, and the like and their homologues and analogues.

The process of the invention comprises reacting the unsaturated ether and water in the vapor phase over a suitable hydration catalyst. The unsaturated ether and steam may be introduced into the reaction zone separately, or the unsaturated ether may be mixed with the water vapor and the mixture of reactants passed over the catalyst at an elevated temperature. The temperature must be high enough to maintain the reactants in the vapor phase but must not exceed that temperature which brings about destruction of substantial amounts of the organic reactant and/or product. Although it is preferable and more convenient to effect the reaction at approximately atmospheric pressure, any suitable elevated or reduced pressure may be maintained if desired. The optimum temperature in any specific case will depend upon the particular unsaturated ether being reacted, upon the specific catalyst used, upon the ether/steam ratio and upon the space velocity maintained.

The process of the invention is preferably executed in the presence of a catalyst. Suitable solid hydration catalysts which may be employed in the execution of the process of the invention include copper sulfate, aluminum sulfate, ferrous sulfate, cobaltous sulfate, nickelous sulfate, aluminum phosphate, cadmium metaphosphate and an activated alumina manufactured by the Aluminum Ore Company of America and sold under the trade name, "H40 alumina." These catalysts may be employed singly or in admixture with one or more of the other catalysts.

It has been found convenient to have the catalyst supported on a suitable carrier such as alumina, thoria, diatomaceous earth, porous Carborundum, silicon carbide porous aggregates, silica gel, and the like. A particularly suitable type of support or carrier is one which is an extremely porous material having a large surface area per unit weight. Adsorptive or activated aluminas have been found to be particularly suitable in the process of the invention. The activated, i. e. adsorptive, aluminas consist mainly of alumina alpha monohydrate and/or gamma alumina, and are characterized by their highly active adsorptive properties. These activated aluminas may be prepared from the so-called "gamma" aluminas of the Haber system [Naturwiss 13, 1007 (1925)] which classifies the various forms of aluminas into two systems, the "gamma" and "beta" systems, depending upon their behavior upon heating. The "gamma" aluminas of the Haber classification comprise gamma alumina proper and all of the so-called hydrated aluminas which, upon heating, are converted into alpha alumina through the gamma form.

The aluminas which upon heating are converted into alpha alumina through gamma alumina and which belong to the "gamma" system of the Haber classification, comprise or form the activated or adsorptive aluminas referred to hereinabove and in the appended claims, and include the alumina alpha trihydrate known as gibbsite or hydrargillite, the alumina beta trihydrate which is isomorphous with hydrargillite and is known also as bayerite, the alumina alpha monohydrate known as bohmite, gamma alumina, gelatinous alumina hydroxide and bauxite. A preferred type of activated or adsorptive alumina is prepared by dehydration of alumina trihydrate crystallized from alkali aluminate solutions. Of this type, a particularly suitable material is that prepared from massive alumina trihydrate, as for example the material described in U. S. Patents 1,868,869 and 2,015,593. Certain selected bauxites such as the activated bauxite sold under the trade name of "Porocel" may also be advantageously employed, particularly in view of the considerably lower cost of such bauxites.

An outstandingly effective catalyst to be used in the hydration of the unsaturated ethers according to the process of the invention comprises copper sulfate which is exceptionally efficient and brings about high percentage conversions to the unsaturated alcohol with little or no formation of the corresponding saturated aldehyde or other by-products. The copper sulfate may be used as a catalyst per se, or it may be disposed upon or associated with a suitable support or carrier such as an activated alumina. A supported copper sulfate catalyst may be prepared by any suitable method such as by dissolving the catalyst substance in water to make a volume of solution just sufficient to wet the granular carrier thoroughly, mixing the carrier with the solution, and drying the mass in air in an oven at approximately 200° C. The copper sulfate may be present in any concentration upon the support, e. g. preferably containing above about 0.25 mole of copper sulfate per liter. A particularly efficient catalyst has been found to be one made up to contain about 0.5 mole of copper sulfate per liter.

Various suitable substances may be added to help promote the catalyst, such as sodium sulfate, potassium sulfate and the like, and the catalyst may be acid-treated or caustic-treated if desired. For example, the dried supported catalyst may be soaked for several hours in water at about room temperature containing dissolved sodium hydroxide in a concentration of from about 0.1 to about 0.5 mole of caustic per liter of catalyst; sodium sulfate may be added in solution along with the copper sulfate in a concentration of from about 0.05 to about 0.5 mole of sodium sulfate per liter. An unsupported copper sulfate catalyst of neutral reaction is prepared by adding sodium hydroxide solution to copper sulfate solution, drying the precipitated cake and granulating it.

The catalyst may be employed in any desirable or suitable form as, for example, in the form of granules, pellets, powders, or fragments of workable size. In using the catalyst in executing the process of the invention, the catalytic material in the form of particles or granules of the desired size is packed preferably into a suitable reaction tube or chamber. The catalytic material is maintained at the desired operating temperature by suitable external heating means and vapors of the unsaturated ether and steam are passed over and through the catalyst mass at a suitable space velocity. The term "space velocity" as employed herein means the number of volumes of unsaturated ether contacted with a volume of the catalyst or reaction space per hour. Any convenient space velocity may be used, depending, for example, upon the conversion desired, the state of the catalyst and the type of catalyst. A space velocity between about 0.1 and 10.0 liquid volumes of ether per volume of catalyst per hour is satisfactory. When using the preferred catalyst, copper sulfate, for example on activated alumina or in the form of the caustic-treated copper sulfate, it has been found convenient to maintain a space velocity of about 0.4 to about 4.0 volumes of ether per volume of catalyst per hour.

The optimum temperature to be maintained in any reaction depends upon the specific catalyst chosen. When copper sulfate is employed as the catalyst, either alone or supported on a suitable carrier such as activated alumina, the temperature maintained is preferably between about 180° C. and about 250° C., although higher or lower temperatures may be used if desired. It has been discovered that copper sulfate is highly active in the hydrolysis, e. g. of diallyl ether, at a temperature of about 190° C. to 225° C., particularly when using approximately a 1.0 to 5.0 weight ratio of water to ether as feed. When "H40 alumina" is employed as catalyst in a similar reaction, satisfactory results have been obtained by maintenance of a temperature of about 300° C.

Any suitable weight ratio of ether to water may be used, and water is preferably present in molar excess over the ether in amounts up to that which will bring about excessive dilution of the reactants and/or products or in any other way interfere with the reaction. In the case of the hydrolysis of diallyl ether, weight ratios of the ether and water of from about 0.5 to 5.0 have been found satisfactory, while a ratio of about 1:1 is highly efficient particularly when copper sulfate catalysts are used.

The catalyst may be regenerated by any suitable known method. For example, the copper sulfate on activated alumina is regenerated by oxidation with air at about 475° C. to about 550° C. This regeneration takes place rapidly, particularly at a temperature between about 500° C. and 550° C., and the regeneration can be initiated at temperatures close to the hydrolysis reaction temperature, so that special air preheaters may not be required.

The following examples illustrate the process of the invention.

*Example I*

Diallyl ether and steam in a weight ratio of about 1:1 were reacted at a temperature of about 190° C. and a pressure of about 1 atmosphere, at an ether space velocity of 0.5 over a catalyst comprising about 158 cc. of copper sulfate on an activated alumina sold under the trade name of Grade A activated alumina. The copper sulfate was present in a concentration of approximately 0.5 mole of copper sulfate per liter of catalyst. After four hours operation the conversion of diallyl ether to allyl alcohol was approximately 29 per cent.

*Example II*

Diallyl ether and steam in a weight ratio of about 1:1 were passed at a temperature of about 200° C. and a pressure of about 1 atmosphere, at an ether space velocity of about 2.0 over a catalyst containing about 0.5 mole of copper sulfate per liter of diatomaceous earth sold under the trade name of Celite V. After 45 minutes of operation a conversion of diallyl ether to allyl alcohol of about 23 per cent was obtained.

*Example III*

When diallyl ether and steam were reacted over about 158 cc. of a catalyst containing about 0.5 mole of copper sulfate per liter of an activated alumina sold under the trade name of Grade A activated alumina, under the same conditions as described in Example II except that an ether space velocity of about 2.1 was maintained, a conversion of diallyl ether to allyl alcohol of about 21 per cent was obtained after 1.75 hours' operation.

*Example IV*

Diallyl ether and steam in a weight ratio of about 1:1 were passed over the catalyst used in Example I, at a temperature of about 225° C. and a pressure of about 1 atmosphere, maintaining an ether space velocity of about 2.1 to obtain a conversion of about 32 per cent to allyl alcohol after one hour of operation.

*Example V*

When diallyl ether and steam were reacted over the catalyst and under the conditions mentioned in Example IV, but maintaining a water-ether feed weight ratio of approximately 2.0, a conversion of about 36 per cent of diallyl ether to allyl alcohol was obtained after one hour of operation.

*Example VI*

In the run described in Example V a conversion of about 35 per cent was obtained after one-half hour of operation.

*Example VII*

Maintaining the conditions described in Example IV, diallyl ether and steam were reacted over copper sulfate which had been treated with sodium hydroxide solution, dried and granulated, and a conversion of about 34 per cent to allyl alcohol was noted after 1.5 hours of operation.

*Example VIII*

Diallyl ether and steam were reacted under the conditions maintained in Example IV, except that a temperature of about 300° C. was employed, and the catalyst used was an alumina sold under the trade name of H4O alumina. A conversion of about 13.5 per cent diallyl ether to allyl alcohol was obtained.

*Example IX*

Diallyl ether and steam at a temperature of about 250° C. under the conditions described in Example II were passed over a catalyst prepared by boiling the alumina known to the trade as Grade A activated alumina in 20 per cent sodium hydroxide for 5 minutes, then digesting for 24 hours in concentrated aluminum sulfate solution. A conversion of diallyl ether to allyl alcohol of about 16 per cent was obtained.

*Example X*

When diallyl ether and steam were reacted at a temperature of about 300° C. under the conditions described in Example II at an ether space velocity of 0.5 for about 50 minutes over a catalyst comprising pelleted aluminum phosphate prepared according to U. S. Patent 1,949,344 with a minor quantity of Hy Flo Super Cel added, a conversion was obtained of 16 per cent of diallyl ether to allyl alcohol.

*Example XI*

Di(methallyl) ether and steam are reacted over the catalyst described in Example I, maintaining the conditions described in Example IV to obtain a good conversion of the ether to methallyl alcohol.

*Example XII*

Employing the conditions described in Example IV, dicrotyl ether and steam are passed over the catalyst used in Example I to obtain a good conversion to crotyl alcohol.

*Example XIII*

Di(3-butenyl) ether and steam are passed over the catalyst described in Example VII under the conditions described in Example IV to obtain 1-buten-4-ol.

*Example XIV*

Allyl methallyl ether and steam are reacted over copper sulfate while maintaining the conditions described in Example IV to obtain a good conversion to allyl alcohol and methallyl alcohol.

We claim as our invention:

1. A process of producing allyl alcohol which comprises passing a gaseous mixture comprising diallyl ether and water present in about equal amounts by weight into contact with a catalyst comprising copper sulfate supported on activated alumina and containing about 0.5 mole of copper sulfate per liter of activated alumina, at a temperature of about 200° C. to 225° C. and at an ether space velocity of about 2.1 liquid volumes of ether per volume of reaction space per hour.

2. A process of producing allyl alcohol which comprises contacting a gaseous mixture comprising diallyl ether and an excess, by weight, of water with a caustic-treated copper sulfate catalyst.

3. A process of producing methallyl alcohol which comprises contacting a gaseous mixture comprising di(methallyl) ether and water with a catalyst comprising copper sulfate supported on an activated alumina.

4. A process of producing crotyl alcohol which comprises contacting a gaseous mixture comprising dicrotyl ether and water with a catalyst comprising copper sulfate supported on an activated alumina.

5. A process of producing allyl alcohol which comprises contacting a gaseous mixture comprising diallyl ether and water with a catalyst comprising copper sulfate supported on an activated alumina.

6. A process of producing allyl alcohol which comprises passing a gaseous mixture comprising diallyl ether and water into contact with a catalyst comprising copper sulfate at a temperature of about 180° C. to 250° C.

7. A process of producing an allyl alcohol which comprises contacting a gaseous mixture comprising water and an allyl ether present in a weight ratio between about 1.0 and about 5.0 with a catalyst comprising copper sulfate supported on an adsorptive mineral carrier.

8. A process of producing allyl alcohol which comprises contacting a gaseous mixture comprising diallyl ether and water with a solid hydration catalyst at a temperature of about 180° C. to 300° C.

9. A process of producing allyl alcohol which comprises contacting a gaseous mixture comprising diallyl ether and water with a solid hydration catalyst comprising a salt of a polyvalent metal.

10. A process of producing an allyl alcohol which comprises contacting a gaseous mixture comprising an allyl ether and water with a solid hydration catalyst comprising copper sulfate supported on an activated alumina.

11. A process of producing an allyl alcohol which comprises contacting a gaseous mixture comprising an allyl ether and water with a solid hydration catalyst comprising copper sulfate.

12. A process of producing an unsaturated alcohol which comprises passing a gaseous mixture comprising a symmetrical unsaturated ether having olefinic bonds in the beta, gamma positions relative to the ether-oxygen atom and water into contact with a solid hydration catalyst comprising copper sulfate at a temperature of about 180° C. to 300° C.

13. A process of producing an unsaturated alcohol which comprises passing a gaseous mixture comprising an unsaturated ether containing an olefinic linkage between two carbon atoms one of which is directly attached to a saturated carbon atom that is directly attached to the ether-oxygen atom and water into contact with a solid hydration catalyst comprising copper sulfate supported on an activated alumina.

14. A process of producing an unsaturated alcohol which comprises contacting a gaseous mixture comprising an unsaturated ether containing a non-aromatic unsaturated linkage between two carbon atoms one of which is directly attached to a saturated carbon atom that is directly attached to the ether-oxygen atom and water with a solid hydration catalyst comprising copper sulfate supported on an adsorptive mineral carrier.

15. A process of producing an unsaturated alcohol which comprises contacting a gaseous mixture comprising an unsaturated ether having a beta, gamma-alkenyl radical directly attached to the ether-oxygen atom and water with a solid hydration catalyst comprising copper sulfate at a temperature of about 180° C. to 300° C.

16. A process of producing an unsaturated alcohol which comprises contacting a gaseous mixture comprising an unsaturated ether containing a non-aromatic unsaturated linkage between two carbon atoms one of which is directly attached to a saturated carbon atom that is directly attached to the ether-oxygen atom and water with a solid hydration catalyst at a temperature of about 180° C. to 300° C.

17. A process of producing an unsaturated alcohol which comprises contacting a gaseous mixture comprising an unsaturated ether having a beta, gamma-alkenyl radical directly attached to the ether-oxygen atom and water with a solid hydration catalyst.

HARRY A. CHENEY.
ROBERT DAGLEY, Jr.
SUMNER H. McALLISTER.

REFERENCES CITED

The following references are of record in the file of this patent:

UNITED STATES PATENTS

| Number | Name | Date |
|---|---|---|
| 2,115,874 | Rehm | May 3, 1938 |

OTHER REFERENCES

Skrabal, Zeit. Physik. Chem. A 185, pages 81–96 (1939). (Copy in Scientific Library.)